US010354450B2

(12) United States Patent
Martin

(10) Patent No.: US 10,354,450 B2
(45) Date of Patent: Jul. 16, 2019

(54) TELELOCATION: LOCATION SHARING FOR USERS IN AUGMENTED AND VIRTUAL REALITY ENVIRONMENTS

(71) Applicant: tagSpace Pty Ltd, Sydney (AU)

(72) Inventor: Paul Simon Martin, Sydney (AU)

(73) Assignee: tagSpace Pty Ltd, Sydney (AU)

( * ) Notice: Subject to any disclaimer, the term of this patent is extended or adjusted under 35 U.S.C. 154(b) by 0 days.

(21) Appl. No.: 15/656,956

(22) Filed: Jul. 21, 2017

(65) Prior Publication Data

US 2018/0033208 A1 Feb. 1, 2018

Related U.S. Application Data

(60) Provisional application No. 62/367,049, filed on Jul. 26, 2016.

(51) Int. Cl.
*G09G 5/00* (2006.01)
*G06T 19/00* (2011.01)
(Continued)

(52) U.S. Cl.
CPC ....... *G06T 19/006* (2013.01); *H04N 1/00244* (2013.01); *H04N 1/32128* (2013.01); *H04N 2201/0084* (2013.01); *H04N 2201/0089* (2013.01); *H04N 2201/3253* (2013.01); *H04N 2201/3254* (2013.01)

(58) Field of Classification Search
None
See application file for complete search history.

(56) References Cited

U.S. PATENT DOCUMENTS 8,238,671 B1 8/2012 Babenko et al.
8,649,803 B1 2/2014 Hamill
(Continued)

FOREIGN PATENT DOCUMENTS

WO WO2017201568 A1 11/2017
WO WO2017201569 A1 11/2017
(Continued)

OTHER PUBLICATIONS

"International Search Report" and "Written Opinion of the International Searching Authority," Patent Cooperation Treaty Application No. PCT/AU2017/050759, dated Oct. 24, 2017, 16 pages.
(Continued)

*Primary Examiner* — Martin Mushambo
(74) *Attorney, Agent, or Firm* — Fenwick & West LLP

(57) ABSTRACT

Provided herein are exemplary embodiments for generating a telelocation, including capturing visual content representing a real world location by a device associated with a user, automatically associating a geographic location with the captured visual content, automatically associating orientation data with the captured visual content, transmitting a data bundle comprising the captured visual content, the geographic location and the orientation data to a server, notifying a remote user about the data bundle on the server, in response to receiving an acceptance from the remote user, transmitting the data bundle from the server to a device associated with the remote user to create a virtual rendering of the real world location.

27 Claims, 8 Drawing Sheets

(51) Int. Cl.
*H04N 1/00* (2006.01)
*H04N 1/32* (2006.01)

(56) References Cited

U.S. PATENT DOCUMENTS

| | | | | |
|---|---|---|---|---|
| 8,908,043 | B2* | 12/2014 | Tricoukes | G02B 27/017 |
| | | | | 348/14.02 |
| 2009/0215427 | A1 | 8/2009 | Hawkins | |
| 2010/0023878 | A1 | 1/2010 | Douris et al. | |
| 2010/0091017 | A1* | 4/2010 | Kmiecik | G01C 11/02 |
| | | | | 345/420 |
| 2011/0055135 | A1 | 3/2011 | Dawson et al. | |
| 2011/0279445 | A1 | 11/2011 | Murphy et al. | |
| 2011/0279478 | A1 | 11/2011 | Bitra | |
| 2012/0086728 | A1 | 4/2012 | McArdle et al. | |
| 2012/0176516 | A1 | 7/2012 | Elmekies | |
| 2012/0242798 | A1 | 9/2012 | McArdle et al. | |
| 2013/0016123 | A1* | 1/2013 | Skarulis | G09G 5/00 |
| | | | | 345/633 |
| 2013/0031142 | A1 | 1/2013 | Wester | |
| 2013/0155181 | A1 | 6/2013 | Williams et al. | |
| 2013/0293585 | A1 | 11/2013 | Sudou | |
| 2013/0325394 | A1 | 12/2013 | Yuen et al. | |
| 2014/0002496 | A1* | 1/2014 | Lamb | G06F 3/14 |
| | | | | 345/633 |
| 2014/0063065 | A1* | 3/2014 | Nishikawa | G06T 19/006 |
| | | | | 345/633 |
| 2015/0124106 | A1 | 5/2015 | Tomita | |
| 2015/0235610 | A1 | 8/2015 | Miller et al. | |
| 2015/0254905 | A1 | 9/2015 | Ramsby et al. | |
| 2015/0379772 | A1 | 12/2015 | Hoffman | |
| 2016/0004298 | A1* | 1/2016 | Mazed | G06F 3/011 |
| | | | | 345/633 |
| 2016/0133230 | A1* | 5/2016 | Daniels | G06T 19/006 |
| | | | | 345/633 |
| 2016/0188585 | A1* | 6/2016 | Durham | G06F 3/011 |
| | | | | 345/633 |
| 2016/0232715 | A1 | 8/2016 | Lee | |
| 2016/0253843 | A1 | 9/2016 | Lee | |
| 2016/0292926 | A1 | 10/2016 | Rosenthal et al. | |
| 2017/0337744 | A1 | 11/2017 | Martin | |
| 2017/0337745 | A1 | 11/2017 | Martin | |
| 2017/0367766 | A1* | 12/2017 | Mahfouz | A61B 34/20 |
| 2018/0059902 | A1 | 3/2018 | Martin | |
| 2018/0075591 | A1 | 3/2018 | Du et al. | |

FOREIGN PATENT DOCUMENTS

| | | |
|---|---|---|
| WO | WO2018018072 A1 | 2/2018 |
| WO | WO2018035564 A1 | 3/2018 |

OTHER PUBLICATIONS

"International Search Report" and "Written Opinion of the International Searching Authority," Patent Cooperation Treaty Application No. PCT/AU2017/050895, dated Nov. 28, 2017, 10 pages.

"International Search Report" and "Written Opinion of the International Searching Authority," Patent Cooperation Treaty Application No. PCT/AU2017/050473, dated Jul. 21, 2017, 14 pages.

"International Search Report" and "Written Opinion of the International Searching Authority," Patent Cooperation Treaty Application No. PCT/AU2017/050474, dated Aug. 23, 2017, 22 pages.

Martin, Paul Simon, "Media Tags—Location-Anchored Digital Media for Augmented Reality and Virtual Reality Environments", U.S. Appl. No. 15/600,446, filed May 19, 2017, Specification, Claims, Abstract, and Drawings, 69 pages.

"EGM96", Wikipedia [online], [retrieved on Sep. 13, 2017], Retrieved from the Internet: <https://en.wikipedia.org/wiki/EGM96>, 3 pages.

Martin, Paul Simon, "Fine-Grain Placement and Viewing of Virtual Objects in Wide-Area Augmented Reality Environments", U.S. Appl. No. 15/600,446, filed May 19, 2017, Specification, Claims, Abstract, and Drawings, 57 pages.

Martin, Paul Simon, "Fine-Grain Placement and Viewing of Virtual Objects in Wide-Area Augmented Reality Environments", U.S. Appl. No. 62/340,118, filed May 23, 2016, Specification, Claims, and Drawings, 16 pages.

"Geographic coordinate system", Wikipedia [online], [retrieved on Sep. 13, 2017], Retrieved from the Internet: <https://en.wikipedia.org/wiki/Geographic_coordinate_system>, 10 pages.

"ECEF", Wikipedia [online], [retrieved on Sep. 13, 2017], Retrieved from the Internet: <https://en.wikipedia.org/wiki/ECEF>, 2 pages.

"Axes conventions", Wikipedia [online], [retrieved on Sep. 13, 2017], Retrieved from the Internet: <https://en.wikipedia.org/wiki/Axes_conventions>, 5 pages.

Bairstow, David, "The Difference Between Location Accuracy and Precision and Why You Need to Know", Skyhook Wireless Blog [online], [retrieved on May 7, 2018], Retrieved from the Internet: <https://www.skyhookwireless.com/blog/advertising/the-difference-between-location-accuracy-and-precision-and-why-you-need-to-know>, Jul. 7, 2015, 4 pages.

Pacha, Alexander, "Sensor fusion for robust outdoor Augmented Reality tracking on mobile devices", Master's Thesis, Institut für Software & Systems Engineering, Dec. 20, 2013, 106 pages.

* cited by examiner

TELELOCATION: LOCATION SHARING FOR USERS IN AUGMENTED AND VIRTUAL REALITY ENVIRONMENTS

CROSS REFERENCE TO RELATED APPLICATIONS

This application claims the benefit and priority of U.S. Provisional Application No. 62/367,049 filed on Jul. 26, 2016 titled "Telelocation: Location Sharing for Users in Augmented and Virtual Reality Environments," which is hereby incorporated by reference in entirety, including all references and appendices cited therein. This application is related to U.S. Non-Provisional patent application Ser. No. 15/600,446 filed on May 19, 2017 titled "Media Tags—Location-Anchored Digital Media for Augmented Reality and Virtual Reality Environments," which is hereby incorporated by reference in entirety, including all references and appendices cited therein.

FIELD OF INVENTION

Embodiments of the disclosure relate to the placement of digital data in augmented and virtual reality environments.

SUMMARY

According to various exemplary embodiments, methods for generating a Telelocation include capturing visual content representing a real world location by a device associated with a user, automatically associating a geographic location with the captured visual content, automatically associating orientation data with the captured visual content, transmitting a data bundle comprising the captured visual content, the geographic location and the orientation data to a server, notifying a remote user about the data bundle on the server, in response to receiving an acceptance from the remote user, transmitting the data bundle from the server to a device associated with the remote user to create a virtual rendering of the real world location. Further exemplary embodiments include the visual content including any of a virtual reality 360-180 degree panorama or a virtual reality 360 degree movie, the geographic location including a longitude, a latitude and an altitude, the orientation data including a current azimuth angle relative to True North, the user updating in real time the virtual rendering of the real world location, the user placing augmented reality graphics content in the virtual rendering, the remote user viewing in real time the augmented reality graphics content in the virtual rendering, the remote user placing augmented reality graphics content in the virtual rendering or in the real world location, the user viewing in real time the augmented reality graphics content from the virtual rendering or in the real world location, the remote user viewing the virtual rendering relative to an actual position of the visual content using the orientation data including the current angle relative to the True North, capturing the geographic location with GPS hardware of the device, capturing the orientation data using any of a sensor on the device, or EXIF information from the visual content, the orientation data further comprising one or more parameters stored when the visual content is captured, the one or more parameters representing a reference for future virtual rendering of the real world location, the device associated with the remote user displaying the virtual rendering of the real world location when the remote user device reads the reference, and the orientation data including a current elevation angle relative to a horizon.

In some exemplary embodiments, methods for generating a Telelocation include capturing visual content and related data representing a virtual reality location by a device associated with a user, automatically associating a location with the captured visual content, automatically associating orientation data with the captured visual content, transmitting a data bundle comprising the captured visual content, the location and the orientation data to a server, notifying a remote user about the data bundle on the server, in response to receiving an acceptance from the remote user, transmitting the data bundle from the server to a device associated with the remote user to create a rendering of the virtual reality location. Further exemplary embodiments include the orientation data further comprising one or more parameters stored when the visual content is captured, the one or more parameters representing a reference for future rendering of the virtual reality location, the device associated with the remote user rendering of the virtual reality location when the remote user device reads the reference, using the reference to position or orientation of the virtual reality location within a Telelocation, the user updating in real time the rendering of the virtual reality location, the user placing augmented reality graphics content in the rendering of the virtual reality location, the remote user viewing in real time the augmented reality graphics content in the rendering of the virtual reality location, the remote user placing augmented reality graphics content in the rendering of the virtual reality location, and the user viewing in real time the augmented reality graphics content from the rendering of the virtual reality location.

Methods for generating a Telelocation, according to some various exemplary embodiments, include capturing visual content and related data representing a virtual reality location by a device associated with a user, automatically associating a location with the captured visual content, automatically associating orientation data with the captured visual content, transmitting a data bundle comprising the captured visual content, the location and the orientation data to a server, notifying a remote user about the data bundle on the server, in response to receiving an acceptance from the remote user, transmitting the data bundle from the server to a device associated with the remote user to create a rendering of the virtual reality location in a real world location. Further exemplary embodiments include the user updating in real time the rendering of the virtual reality location in the real world location, the user placing augmented reality graphics content in the rendering of the virtual reality location in the real world location, the remote user viewing in real time the augmented reality graphics content in the rendering of the virtual reality location in the real world location, the remote user placing augmented reality graphics content in the rendering of the virtual reality location in the real world location, and the user viewing in real time the augmented reality graphics content from the rendering of the virtual reality location in the real world location.

According to other various exemplary embodiments, methods include accessing visual content representing a real world location by a device associated with a user, automatically associating a geographic location with the captured visual content, automatically associating orientation data with the captured visual content, transmitting a data bundle comprising the captured visual content, the geographic location and the orientation data to a server, notifying a remote user about the data bundle on the server, in response to receiving an acceptance from the remote user, transmitting the data bundle from the server to a device associated with the remote user to create a virtual rendering of the real world location. Additional exemplary methods include accessing visual content and related data representing a virtual reality location by a device associated with a user, automatically associating a location with the captured visual content, automatically associating orientation data with the captured visual content, transmitting a data bundle comprising the captured visual content, the location and the orientation data to a server, notifying a remote user about the data bundle on the server, in response to receiving an acceptance from the remote user, transmitting the data bundle from the server to a device associated with the remote user to create a rendering of the virtual reality location. Further additional methods include accessing visual content and related data representing a virtual reality location by a device associated with a user, automatically associating a location with the captured visual content, automatically associating orientation data with the captured visual content, transmitting a data bundle comprising the captured visual content, the location and the orientation data to a server, notifying a remote user about the data bundle on the server, in response to receiving an acceptance from the remote user, transmitting the data bundle from the server to a device associated with the remote user to create a rendering of the virtual reality location in a real world location.

DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

Figure 1:
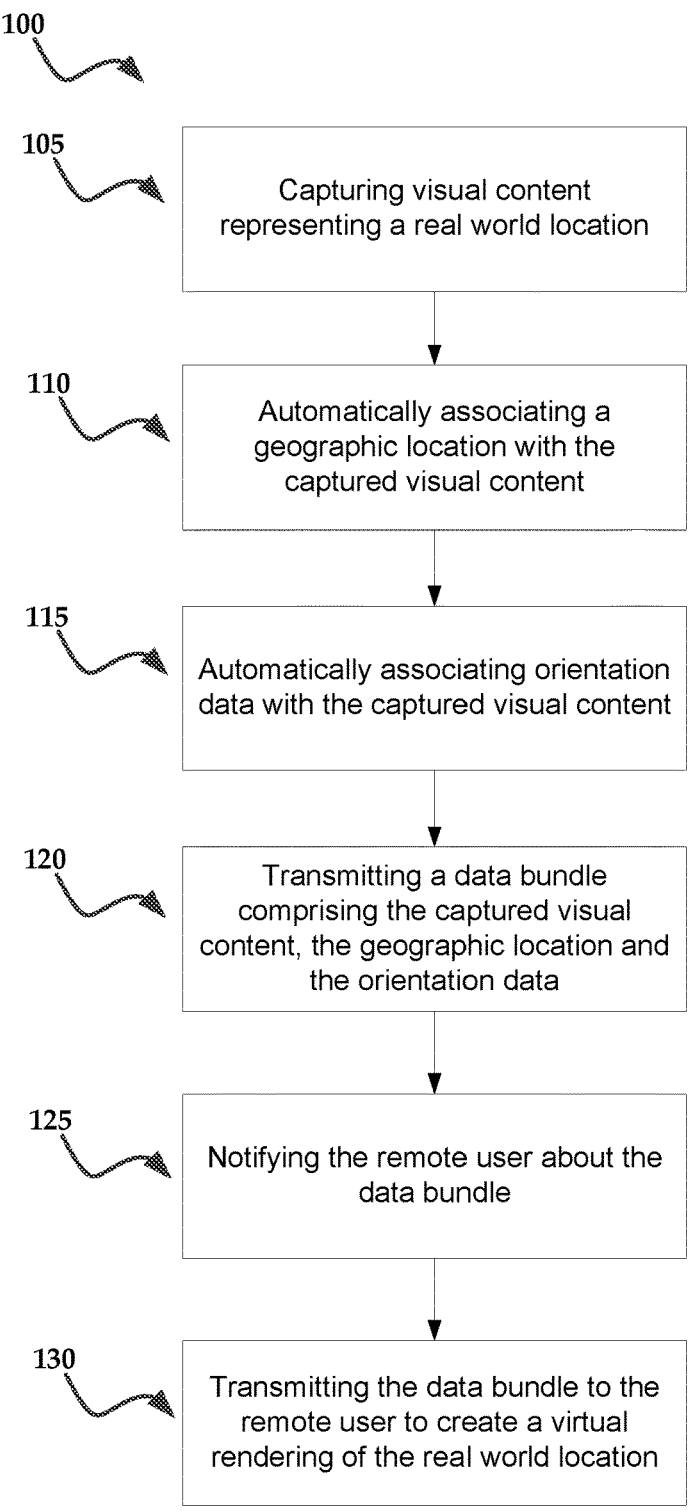
FIG. 1 is a flowchart of an exemplary method for capturing a real world location's surroundings and other aspects of that location as digital data, using a digital device, such that the data can be bundled, transmitted, and used to create a virtual rendering of that location on another device.

Digital media currently allows users to create and share their experiences online through resources such as web pages and multimedia content. However, a more immersive experience would consist of allowing users to directly share user-navigable, visual content while allowing users to add, update, and view changes in real time. This would comprise of one user either capturing their current location surroundings as visual computer data along with their location and orientation, or selecting such existing data, and directly sharing that data with one more users, in effect, enabling those other users to view and experience the essence of that location just as the original, authoring user did, and in the same orientation. Such a system must also allow all users to add or modify digital content (e.g. virtual objects) for that shared location, such that all users viewing that shared location would visually see those updates in real time. Such additions or modifications to the digital content could also be made by any user viewing that location such that all users viewing that location are able to both contribute content and see content from other users in real time.

Users should therefore have a mechanism comprised of client devices running digital media software, whereby a user can capture all of the visual elements in their current surroundings as digital data on their client devices or select from existing digital data, and to then publish that data to other users over a computer network. Those other users should be notified about the availability of that location data, with the option to download that location data to their client device, orbit around, view, and experience that location just as the original creator did. All users including the creator and the other users, using their client devices with digital media software, should be able to place or update virtual objects (e.g. Media Tags) within that location data, and the changes should be seen in real time by all users who are viewing that location data. For more information about Media Tags, see U.S. Non-Provisional patent application Ser. No. 15/600,446 filed on May 19, 2017 titled "Media Tags—Location-Anchored Digital Media for Augmented Reality and Virtual Reality Environments," which is hereby incorporated by reference in entirety, including all references and appendices cited therein.

For example, using a device with a viewport (e.g. a smartphone with a built in camera and touch screen display) an authoring user should be able to capture their surroundings in the real world through that viewport as a 360-180 degree panorama mapped to bounding volume, store it as digital data, and share that digital data with other users. Other users should then be able to view that visual data inside of that bounding volume which contains a 360-180 degree panorama of the authoring user's surroundings, thus allowing other users to see the location just as the authoring user did. Similarly, such a 360-180 degree panorama may already exist, so the authoring user may be able to select that existing data for sharing, rather than having to capture it.

Take this example and extend it to a virtual reality environment whereby a virtual location (e.g. within a video game world), is captured by a user and shared with other users in the same fashion. Users can view a virtual location by way of a virtual reality interface ("VRI"). A VRI in this case may be a setup as simple as a single smartphone, visualizing a 360-180 degree panorama which is navigable by rotating the smartphone device and/or swiping its screen, or something more complex such as a room-sized VR rig utilizing head mounted displays and laser motion trackers.

Mixed reality sharing of location data should also be possible, such that data of an AR location can be viewed on a VR device, and conversely, VR data on an AR device.

A method for capturing a location within augmented or virtual reality environments, hereafter known as a "Telelocation". A Telelocation is comprised of a VR digital capture of a given location from either a real or virtual environment. The Telelocation not only contains all of the digital data necessary to visually reconstruct the location on another device within a bounding volume, but also a frame of reference such that the same orientation is maintained across devices, while any additions or modifications of virtual objects cause those objects to also appear in the correct position and orientation when viewed across devices. This allows one user to effectively capture their surroundings as digital data or selecting from existing data, and to share that digital data package with other users, such that other users can view, orbit around, and optionally move around that location, and experience the essence of it, just like the original authoring user did. In effect, a Telelocation is a location that a user can teleport to without physically having to travel there, that respects the original orientation, relative to an established frame of reference. Furthermore, any user who is viewing that Telelocation can then add or update additional digital media objects within that Telelocation. The additions or updates will appear in real time on the displays of all users' devices that are viewing that location and will appear in the correct position and orientation.

For example, User A is on a beach in Sydney and captures a 360-180 degree panorama using their device and shares it as a Telelocation with User B who is somewhere in London. User A places AR graphics content in the real world environment, User B sees that content appear in the corresponding position in their VR Telelocation environment.

User A is on a beach in Sydney and captures a live 360-180 degree panorama view using their device and shares it as a Telelocation with User B who is somewhere in London. User B places graphics content in the captured Telelocation that they are viewing in a VR Telelocation environment, User A sees that content appear in real time, in the corresponding real-world position via AR.

The visual data of a Telelocation can comprise digital data captured by a user's device such as, but not limited to: VR 360-180 degree panorama/360 degree video, video game 360-180 degree panorama, a VR movie—single frame or section of the movie, texture/geometry data (e.g. in video games), or a real-time video feed, which is rendered onto the inside of a bounding volume, such that when viewed from the inside of that bounding volume by another user, appear identical or almost identical, to what the original authoring user saw through their device's viewport. Since there is a complete 360 degree visual view available, other users can orbit around and experience the complete 360 degree view of the surroundings of the captured location. For example, if the authoring user who captured the location saw a building at True North, then a viewing user is who viewing that Telelocation and is also facing True North, should see that building exactly how the authoring user saw it.

In order for the visual Telelocation data to be viewed in the same orientation as when it was captured, a frame of reference for the position and orientation of the Telelocation data must be established by the digital media software running on client devices. The capturing device must record parameters of the client device which describe the device's orientation relative to that frame of reference and package these parameters with the visual data. Having a frame of reference and recording the device's relative position and orientation is also used to accurately place and orient digital media objects with a given Telelocation.

A frame of reference can consist of, but is not limited to: angular offsets from True North and the horizon in the real world, angular offsets from the 3D axis of a VR environment, as well as location data, such as latitude, longitude, and altitude in the real world, or and X, Y, and Z coordinates in a VR environment.

The frame of reference data forms part of the metadata which is included in a Telelocation package. Other metadata can include, but is not limited to: tags for searching that location, thumbnail picture data for selecting the Telelocation on a device, and information about the characteristics of the bounding volume.

Throughout this specification various terms are used and shall assume the following meanings and assumptions:

Augmented Reality ("AR"): a digital system or interface through which the user can view their surroundings with augmentations to that view. Any discussion of AR or related aspects of it refers to augmentation of a real world or "AR" environment. An AR platform creates a virtual graphics coordinate space that coincides with the real-world space around a user and renders computer graphics relative to that virtual graphics coordinate system such that those graphics appear to exist in the real world. An appropriate viewing device is also assumed for the user, such as but not limited to: a head-mounted display (e.g. augmented reality glasses or goggles) or a smartphone (i.e. acting as a viewing portal that displays computer graphics on top of, or blended with, a live video feed of the world as seen by camera hardware embedded in the device).

Virtual Reality ("VR"): a virtual reality platform creates a virtual graphics coordinate space into which computer graphic content is rendered in such a way that when viewed through a viewing device, all the user sees are computer graphics. No real world objects are seen in this environment. Appropriate viewing and interaction devices are also assumed for the user, such as, but not limited to: head-mounted displays, optionally with body or body-part motion tracking sensors and software, smartphones (i.e. acting as a viewing portal that displays computer graphics on top of, or blended with, a computer graphics environment background).

Frame of Reference: one or more aspects which establish the orientation and location for a Telelocation, as well as digital objects placed within that Telelocation. Telelocation data comprises metadata fields (herein referred to as "parameters") which store a given location's orientation and position relative to the established frame of reference. The orientation values are essential for ensuring that the orientation of a Telelocation appears the same both on the authoring device and on other devices which are viewing it, while the position values ensure that any digital media added appear in the correct position(s) within the Telelocation. Likewise, the orientation and position values, ensure that digital objects placed within a Telelocation, appear in the same position and orientation on all devices.

360-180 degree panorama: a 3D digital view of a location comprising the ability to pan 360 degrees horizontally and 180 degrees vertically leading to a full coverage of the surroundings.

FIG. 1 illustrates an exemplary process 100 for sharing the visual surroundings of a real world location as digital data 105 using a client device with digital media software. The digital media software has an established frame of reference comprising a geographic location and an orientation. The device with digital media software captures the geographic location 110 and orientation 115 of the device, which are then associated with the data. Together, the visual data, location, and orientation are bundled and transmitted 120 over a computer network for viewing on other devices by remote users. Such remote users may receive a notification 125 about the bundle which, when accepted by the user for download, allows the transmission of the data bundle to their client device 130 which then creates a virtual rendering of the location.

For example, digital media software executing on a smartphone may allow a user to capture a 360-180 panorama of their real world surroundings along with the location and orientation of that device in one country, and then send that data over the Internet to a friend in another country who can then view that location on their device and experience the essence of that location just as the original user did.

Figure 2:
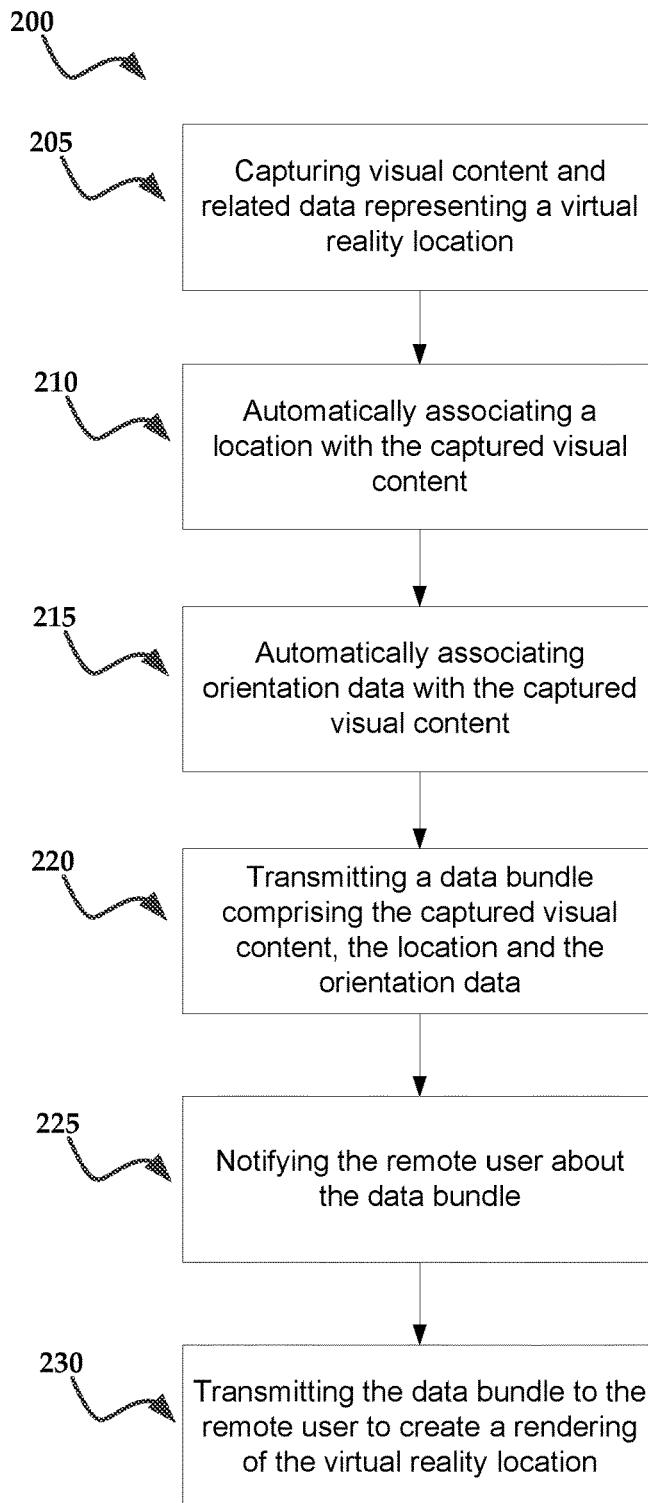
FIG. 2 is a flowchart of an exemplary method for capturing a virtual world location's surroundings and other aspects of that location as digital data, using a digital device, such that the data can be bundled, transmitted, and used to create a virtual rendering of that location on another device.

FIG. 2 illustrates an exemplary process 200 for capturing a virtual world location's surroundings as digital data 205 using a client device with digital media software. The digital media software has an established frame of reference comprising one or more axes in Cartesian coordinate space that the position and pitch of the user's viewport must be relative to. The device with digital media software captures the geographic location 210 and orientation 215 of the device, which are then associated with the data. Together, the visual data, location, and orientation are bundled and transmitted 220 over a computer network for viewing on other devices by remote users. Such remote users may receive a notification 225 about the bundle which, when accepted by the user for download, allows the transmission of the data bundle to their client device 230 which then creates a virtual rendering of the location.

For example, a digital media software component executing within a video game may allow a user to capture a 360-180 panorama of their virtual world surroundings along with the location and orientation. The user can then send that data over the network to a friend who can then view that location on their device and experience the essence of that virtual location just as the original user did.

Figure 7:
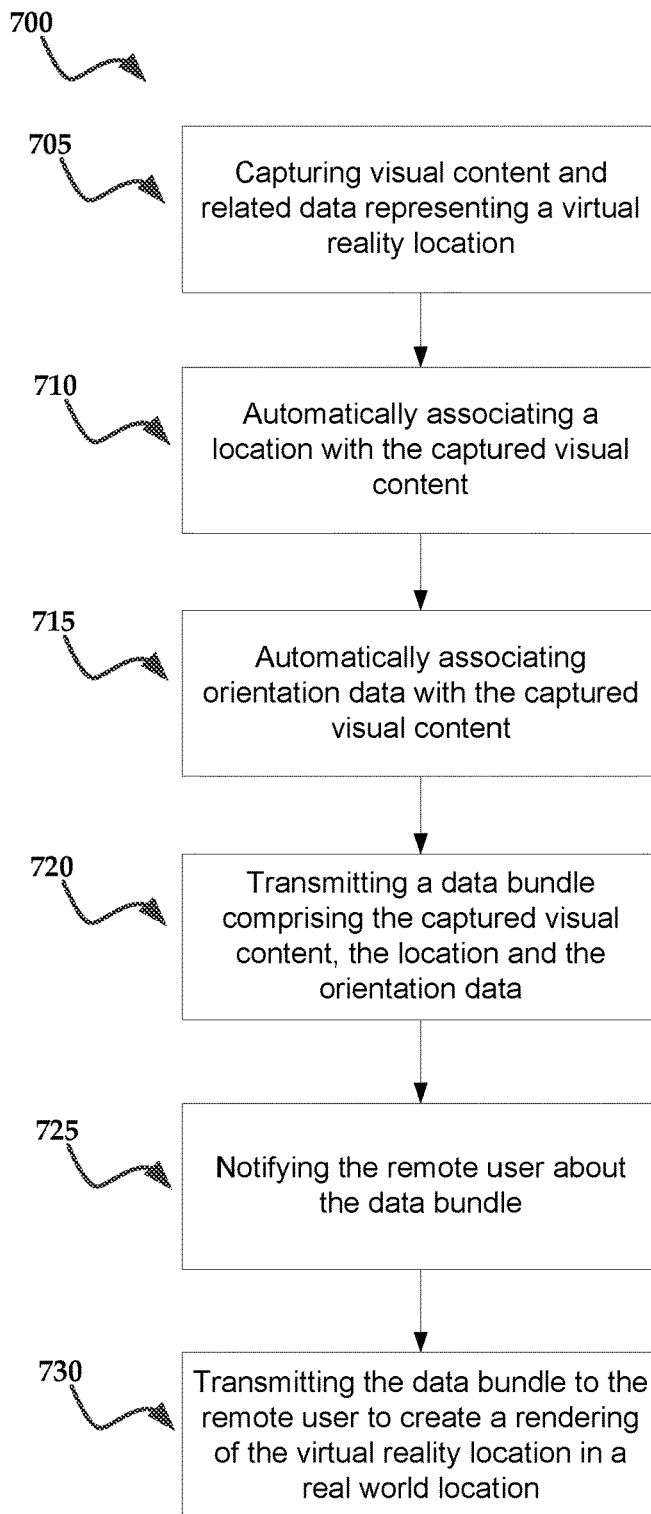
FIG. 7 is a flowchart of an exemplary method for capturing a virtual world location's surroundings and other aspects of that location as digital data, using a digital device, such that the data can be bundled, transmitted, and used to create a virtual rendering of that location on another device which displays real world locations.

FIG. 7 illustrates an exemplary process 700 for sharing the visual surroundings of a virtual world location as digital data using a client device with digital media software. The digital media software has an established frame of reference consisting of a geographic location and an orientation. The device with digital media software captures the visual data 705 and associates a geographic location 710 and orientation 715 of the device with the visual data. Together, the visual data, location, and orientation are bundled and transmitted 720 over a computer network for viewing on other devices by remote users where the devices of these remote users display real world locations. Such remote users may receive a notification 725 about the bundle which, when accepted by the user for download, allows the transmission of the data bundle to their client device 730 which then creates a virtual rendering of the location. An aspect of process 700 is that a virtual world Telelocation is being shared with a viewing device that typically displays real world surroundings. This highlights that "mixed reality" sharing of Telelocations are possible and that devices which capture Telelocations can be completely different types of devices from those that display Telelocations.

For example, a user playing a video game may capture their surroundings at some location in that virtual world as a Telelocation using their video game console and the user interface provided by the game. That Telelocation can then be sent to a user in another part of the world who receives it on their smart phone. The user with the smart phone can then view that virtual world Telelocation, which in effect, allows them to jump between a real world location (i.e. their current surroundings) and a virtual world location.

Figures 3A, 3B:
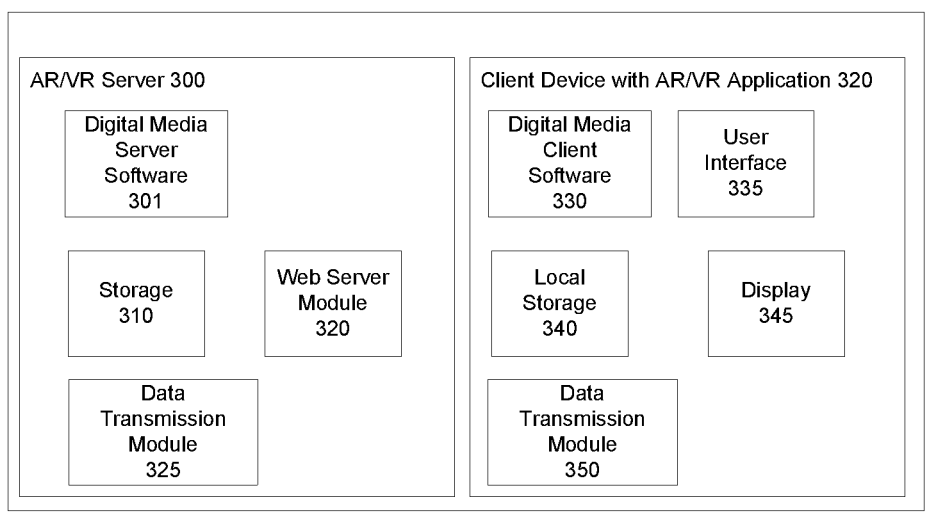
FIG. 3A is a block diagram of an exemplary server-side system for practicing aspects of the present technology. Note that a "server" may optionally comprise multiple distributed computer systems.
FIG. 3B is a block diagram of an exemplary client-side system for practicing aspects of the present technology.

FIG. 3A is a block diagram showing exemplary components which may be part of server 300 and used to store and communicate digital content updates to remote client devices. The server 300 may host digital media server software 301 capable of communicating with client devices 320. The server may use or communicate with a storage component 310 (e.g. a database management system), to store and retrieve digital media and associated data. The server may utilize web server software 320 to expose the digital media server software 301 over the network to remote clients. The web server software 320 in conjunction with the digital media software 301, may expose a high level communications path or protocol (e.g. a web API), through which client side digital media software 330 executing on client devices 320 and the server side digital media software 301 may exchange data with. This data may be sent through data transmission module 325 which provides the ability to send and receive information over a computer network (e.g. an Ethernet connection).

FIG. 3B is a block diagram showing exemplary components which may be part of client device 320 allowing a user to create, edit, and/or view digital content in an AR or VR world. This functionality may be provided on the client device 320 through digital media client software 330 installed or available on client device 320. Client device 320 may feature user interface 335 elements (e.g. touch screen controls, buttons, etc.) allowing the user to author digital content in, and navigate around, an AR/VR world. Client device 320 may also provide an appropriate display 345 (e.g. touch screen, VR goggles, etc.) allowing the user to view an AR/VR world as well as digital content that may have been placed in that world. The client device 320 may have or utilize local storage 340 for the purposes of caching any data necessary to author and view digital content as objects in the world they are viewing. The client device 320 may communicate with a server 300 using the high level communications path or protocol exposed by the web server module 320. This communication exchange may take place through data transmission module 350 which provides the ability to send and receive information over a computer network (e.g. WiFi).

Storage of digital data involves persisting digital data locally on a client device and/or over a network to a remote server.

A server 300, along with its storage facilities, may be used to store and communicate the state and data of all digital data which have been placed in the world by all users, over a computer network.

Storage of multimedia data may be required on both the client device 320 and/or on the centralized server 300. When multimedia data is created on a client device, that data may be stored on the device as a local representation of that data, for consumption by the user. The data may also be sent to a server so that the content can be viewed by other users capable of viewing it.

Figure 4:
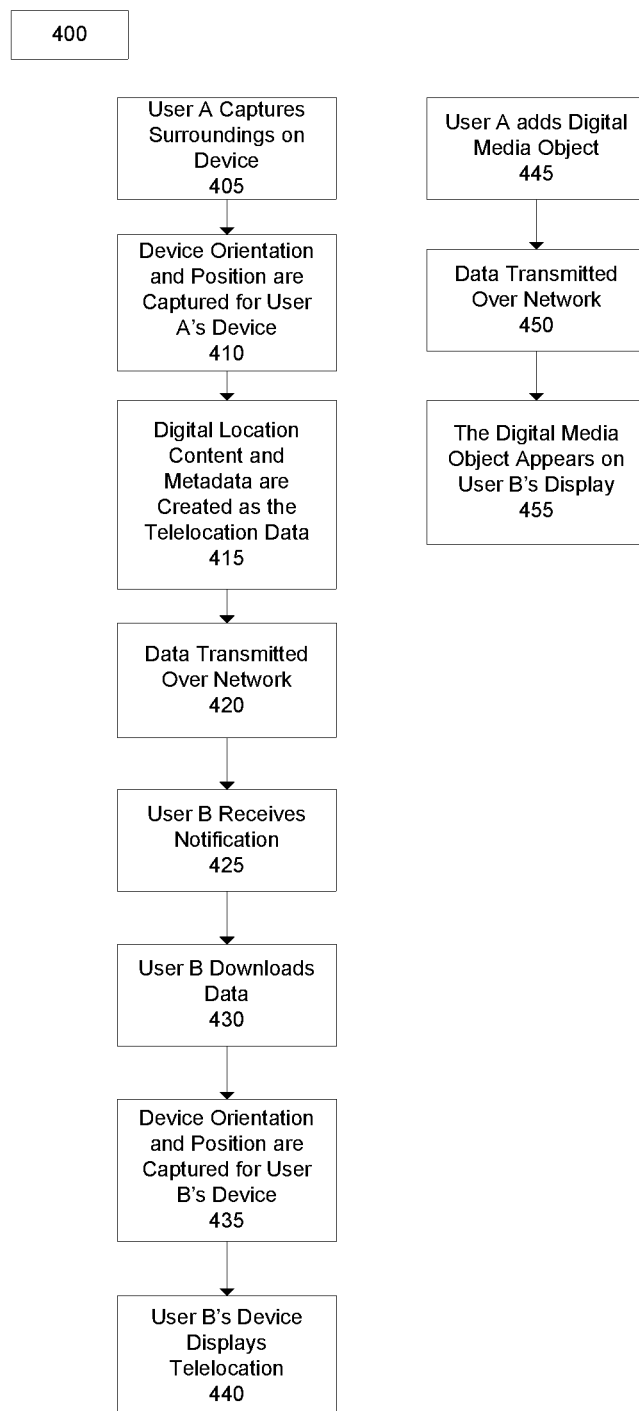
FIG. 4 illustrates an exemplary process for capturing or selecting a Telelocation on one device and sending that location data to another device, as well as the process where users add and share digital media within that location in real time.

FIG. 4 illustrates an exemplary process 400 for capturing a new Telelocation or selecting an existing Telelocation on one device and sending that location data to another device, as well as to add and send a digital media object (e.g. Media Tag) for that location between users.

In process 400, User A either captures their current surroundings 405 or selects an existing Telelocation using their client device 320 (FIG. 3B). If the user is in the real world and capturing their surroundings, then they are presumed to be using a device capable of capturing their surroundings and storing them as digital data in some fashion. Examples of formats for capturing real-world surroundings include, but are not limited to: 3D 360-180 degree panoramas, 360 degree videos, and static panoramas which can be panned when viewed. If the user is immersed within a VR environment (e.g. a video game), then the client device 320 may provide a user interface allowing the user to capture their current surroundings from within that VR environment.

Examples of capturing digital surroundings in a VR environment include, but are not limited to: using the software's camera perspective to capture a 360 degree view, rendering graphics directly to a cube map or sphere, and capturing geometry and texture data of the visible surroundings.

For both the AR and VR cases, a "captured location" is composed of the data necessary to construct an enclosed volume such that another user can see the visual details of the location in all directions on their client device 320, as if they were immersed in that location.

If User A is capturing their current surroundings 405, their client device 320 also captures the device's orientation and position relative to the established frame of reference 410. The purpose of capturing such parameters relative to an established frame of reference 410, is so that the orientation of the Telelocation will be the same when viewed by another user on their device and so that the position and orientation of any digital objects placed within that Telelocation appear in the same position and orientation on any device viewing that Telelocation.

There are many types of frames of reference which may be used including, but not limited to, capturing the device's orientation angle relative to True North and the horizon. For example, consider a scenario where True North and the horizon are the established frames of reference and an authoring user captures a Telelocation where their device is facing 10 degrees west and 45 degrees upwards. When another "viewing user" views that Telelocation on their device, orienting their device northwards will show the visual details that the authoring user would have seen when they were looking north through their device. Similarly, if the viewing user is angling their device 45 degrees upwards, their view of the Telelocation would match what would have been seen when the authoring user was looking 45 degrees upwards. Note that factors such as, but not limited to: viewport settings, and device rendering capabilities, may cause a slightly different viewing experience across devices such as, but not limited to, a different field of view.

If the user has been capturing their current surroundings 405, the client device 320 then stores the visual data and creates the metadata consisting of the device's parameters relative to an established frame of reference 415, collectively the "Telelocation data", necessary to correctly render that Telelocation on other users' devices in the correct orientation. Alternatively the user may select existing Telelocation data for sharing.

The bundled Telelocation data is then transmitted over the computer network 420 so that it arrives at User B's device. This transmission may involve an intermediary server 300 (FIG. 3A) that may store and coordinate the sharing of such data between users. The server 300 may then send a notification 425 to any user(s) associated (e.g. subscribed) with User A, indicating that a Telelocation is available for viewing.

User B receives the notification 425 on their client device 320, which may provide an appropriate user interface to accept and download the Telelocation data. Such a user interface may also provide additional elements allowing the user to select a Telelocation such as, but not limited to: a Telelocation browser/carousel showing thumbnails or text of recommended locations to visit, a 2D map of places around the world that can be visited via Telelocations, or a search box to find Telelocations.

When User B downloads 430 and proceeds to view the Telelocation, User B's client device determines its device's parameters relative to the established frame of reference 435 so that it can display it in the same orientation as it was captured on User A's device. User B's client device 320, then displays the Telelocation data 440, allowing User B to see and be immersed in the Telelocation captured by User A.

User A may then add digital media objects near to their location 445. The data for these objects is transmitted over the network 450, and automatically appear on User B's device 455 in the same location where they were placed by User A relative to User A's location. For example, if User A placed a digital media object on a fire hydrant in the Telelocation, then User B would also see that digital media object on the fire hydrant. Likewise, User B may add or modify a digital media object for the Telelocation. The data is then transmitted over the network and the update appears on User A's device in real time.

An aspect is that there are two types of data transmission. The first is the transmission of the Telelocation data itself, which is used to initially get the Telelocation data over to another device, so that the visual scene can be established on that device. Once received, that Telelocation data should not need to be retransmitted to the same device again. It would only need to be transmitted to another device which is requesting the Telelocation. The second type of transmission includes the two-way additions/updates to digital media objects which may be performed by any user viewing the Telelocation itself or the underlying real or virtual location that was used to construct that Telelocation. For these updates, it's not necessary to retransmit the entire location bundle but just the information related to the digital media objects. For example, consider a scenario where User A is in the real world and has captured and sent a Telelocation of their surroundings to User B who is viewing it on their device. The Telelocation data bundle will be sent from User A to User B over a computer network once. User A, who is viewing their real world surroundings, may then add a digital object nearby. The information for that digital object is then sent to User B who sees it appear in real time within their Telelocation. Thus, once the scene has been established on User B's device, the only data necessary to transmit to User B is the data required to display the digital media object on User B's device.

Note that the device which captures Telelocation data may be a completely different type of device from that which is receiving and viewing the Telelocation. For example, the capturing device may be a special type of 360 degree camera whose main capability is capturing panoramic views, while another device that is viewing the Telelocation may be a smartphone with digital media software capable of rendering a Telelocation and allowing the user to add digital content. This is especially true for mixed reality scenarios which are described next.

In addition to supporting AR Telelocations between AR devices and VR Telelocations between VR devices, a process such as that depicted in Example 400 may also optionally support mixed reality sharing of AR Telelocations between AR and VR devices, and/or of VR Telelocations between AR and VR devices.

For example, in an augmented-to-virtual reality scenario, a user may click on a computer graphics information billboard (or a "click to telelocate inside" graphical user interface button) that appears to be attached to the top of a real-world building at which point their augmented view is replaced with an immersive 360 degree VR photographic image of a location inside of that building.

Another example is a virtual-to-augmented reality scenario, where a user is in a 3D computer graphics world at one location and causes their virtual avatar to enter a 3D bounding volume object, or clicks on a virtual button that is labelled "Take me back to reality!" that causes the user to be transported to an augmented view of the real world. Additional details about mixed-reality sharing are provided below in the description for FIG. 8.

Note: when performing mixed reality sharing, it may be necessary to translate the frame of reference, and any related device parameters such that they make sense in both realities. For example, when entering a VR Telelocation in an AR environment, one of the axis from the VR environment may be designated as True North such that a VR Telelocation which doesn't contain a real-world frame of reference can be properly oriented in an AR environment that may not be mapped using an X, Y, and Z axis.

Figure 5:
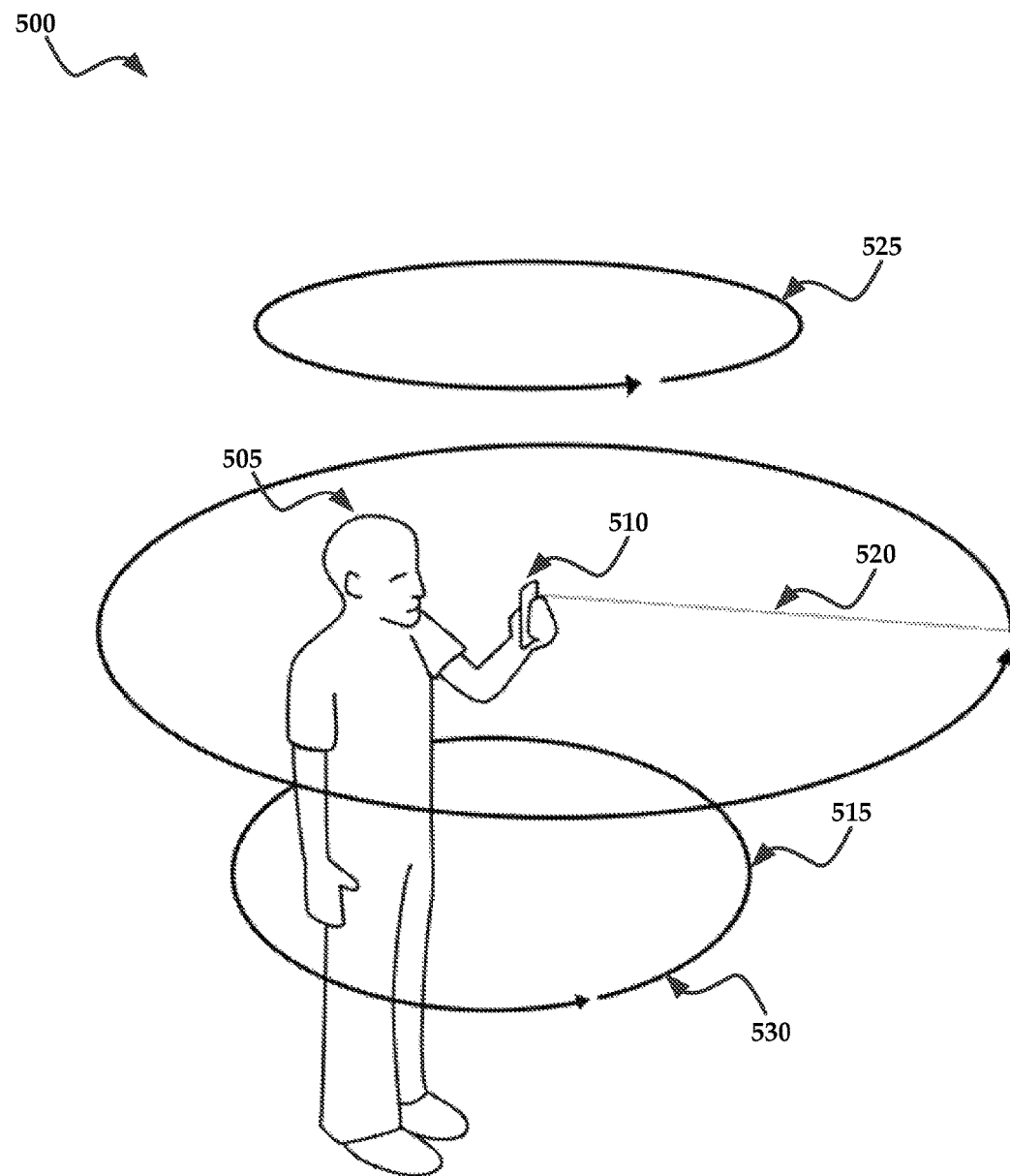
FIG. 5 illustrates an example depicting how a user may capture their real-world surroundings with a client device, and also how a user may view a shared Telelocation with a client device.

FIG. 5 provides an example 500 depicting how a user 505 may capture their real-world surroundings and the device's parameters relative to an established frame of reference with a client device 510. Depending on the capabilities of the client device 510 and its digital media software, as well as the type of data being captured (e.g. a 360-180 degree panorama view), the user be required to move in different directions to perform a capture. There are many types of cameras and lenses available which varying capabilities for capturing 360-180 images and 360 degree videos such as, but not limited to, 360 degree cameras which can create a single 360-180 in a single camera press. Such cameras either have two fisheye lenses back to back, or multiple cameras (e.g. 12) facing at all angles to get 360-180 coverage.

In Example 500, the user 505 is holding a smartphone 510 equipped with an onscreen display and camera. The user 505 is using a capture method that requires them to pan around on the spot 515, first with the device pointing outwards at about eye level 520 and then towards an upward angle 525 and downward angle 530 to capture a full sphere of data that can be rendered to a bounding volume.

Example 500 is a simplified example for illustrative purposes only. Depending on the device's vertical field of view, panning is typically necessary at multiple angles both upwards and downwards. In practice, typically five different angled pans will capture most of the surrounding area, but may require a few more captures to patch in the top and bottom poles with visual data.

Note that other device types and software may require the user to perform additional or alternative actions in order to capture and generate data for their full surroundings. For example, capturing a user's location in a VR environment could comprise of simply capturing the user's current X, Y, Z location, orientation angles, the size and shape of the area to capture, along with any related digital data necessary to recreate the visual location.

Figure 6:
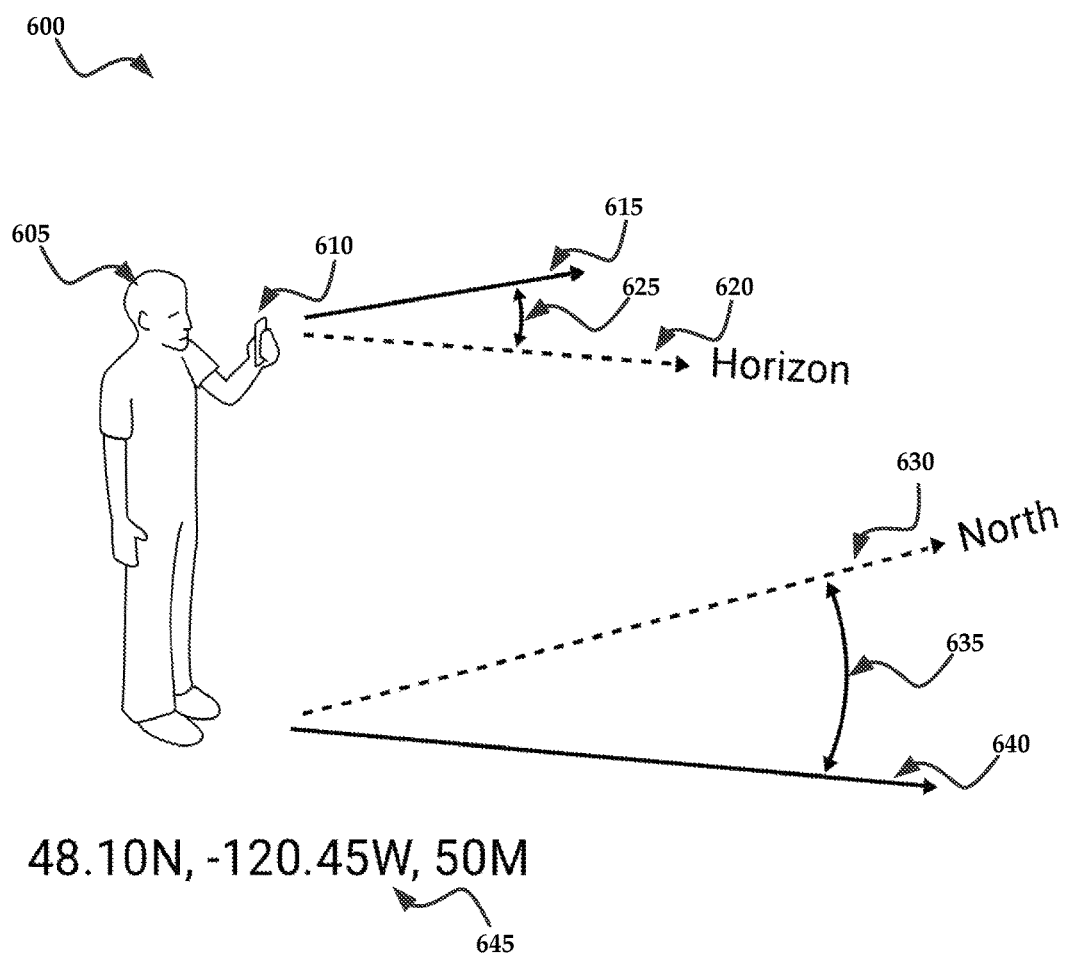
FIG. 6 provides an example of how capturing a device's parameters relative to an established frame of reference may be captured along with the visual location data.

FIG. 6 provides an example 600 showing the aspects of capturing a device's parameters relative to the established frame of reference in the real world, in this example, relative to True North 630 and the horizon 615. A frame of reference is necessary in order for another "viewing" client device to view the Telelocation exactly as the authoring client would have viewed it, given that the other viewing device may be panning at any given angle relative the origin of that Telelocation but within the Telelocation's bounding volume.

Similarly, digital media software running on a client device 610 may optionally allow the user to move around (i.e. change their position) to some extent within the bounding volume of the Telelocation, so the device's parameters relative to the established frame of reference, allow for correct and accurate viewing of the Telelocation and any digital media objects, just as if the authoring user had moved to that location. Note however that supporting random movement would require multiple Telelocations, as a telephoto is a capture of a view at a single position. Moving around in the bounding volume for preset travel paths would still show the world from the position the Telelocation was captured. However, while a 360 degree video can show correct imagery for preset movement paths, it can't handle random movement by the viewer. Movements would therefore transition between pre-captured Telelocations in "jumps", much like how the "streetview" feature of a digital map currently does.

An aspect is that the user may be facing in any direction when they start the capture, so without a frame of reference, there would be no way to orient the location on another device such that it matches that on the original authoring device. In addition, capturing the user's position such as, but not limited to, their latitude, longitude, and altitude, or X, Y, and Z coordinates, allows client devices to place digital media such that it will appear in the correct spot on all user devices in real time which are viewing that Telelocation, if the digital media data is tagged with a position that is within the Telelocation. For additional information see U.S. Non-Provisional patent application Ser. No. 15/600,446 filed on May 19, 2017 titled "Media Tags—Location-Anchored Digital Media for Augmented Reality and Virtual Reality Environments," which is hereby incorporated by reference in entirety, including all references and appendices cited therein.

Capturing a Telelocation on one device and reproducing the Telelocation on another device in the same orientation, in turn, may need that both the authoring device and other devices on which the Telelocation will be viewed, are both capable to interpreting the same frame of reference (or translating between different types of frames of references for mixed reality cases), and displaying a Telelocation and any placed digital media objects relative to that frame of reference.

To achieve this, the client device running digital media software which is capturing the location, should "register" the Telelocation to a specific frame of reference (i.e. establish what frame of reference will be used and capture the device's parameters relative to that frame of reference) so that other users see the same world and the same device orientations, as well as accurate placement and orientation of any digital media objects placed within that Telelocation.

Depending on whether the user is capturing an AR or VR location, a device's data relative to an established frame of reference may include, but is not limited to:

The frame of reference itself: the data describing what frame of reference is to be used in order to accurately display the data on any given device.

Heading: the direction the user's device is facing relative to some fixed direction. For example, in an AR environment this may be the angle relative to an axis on the earth (e.g. relative to True North). For a VR environment this may be angles relative to an axes of a virtual world (e.g. relative to the x axis and y axis).

Pitch: the direction the user's device is pointing up or down. For example, an AR environment this may be the angle relative to the horizon (pitch angle). For a VR environment, this may be angles relative to the X, Y, and Z axes.

Position within the world: the precise position of the user within their environment. For an AR environment this may be the latitude, longitude, and altitude. For a VR environment, this may be the X, Y, Z offset of the user relative to some point in space such as the origin of the VR environment.

Including such parameters relative to an established frame of reference may be needed for accurately viewing digital media objects within a Telelocation because the visual Telelocation data is imagery data mapped onto a bounding volume. The parameters relative to an established frame of reference provide the additional placement information necessary to place and orient any digital media objects so that they appear exactly (or near exactly) as they were placed on a given device. For example, consider visual Telelocation data consisting of a 360-180 view of a street with many shops and restaurants, where each venue has its own Media Tag placed above it and each Media Tag is pointing to a specific venue with information about the venue. In this case the parameters relative to an established frame of reference ensure that each Media Tag can be accurately placed and pointed to the correct venue.

In Example 600, an authoring user 605 is starting to capture their surroundings using their smartphone 610. Sensors on the smartphone 610 may be used to capture the device's parameters relative to the frame of reference. Such sensors may include, but are not limited to: compass, gyroscope, GPS, accelerometer, and barometer. Other data may also be used such as, but not limited to EXIF information stored in a digital photo.

In Example 600, the frame of reference parameter data captured by the client device 610 includes: the pitch of the user's device 625 which is the vertical angle between the horizon 615 and the direction 620 that the user's device 610 is pointing. In In example 600, using the horizon as a frame of reference registers the centre of the captured location to the horizon so that when the Telelocation is viewed on another device, it shows the correct viewpoint as the user pitches the device. Example 600 further includes the user's direction which is an offset angle 635 from True North 630 and their current facing direction 640 and the user's latitude, longitude, and altitude 645.

It should be noted that regardless of the method used to capture frame of reference parameter data in an AR environment, there may be some disparity between viewing the real location's surroundings directly (i.e. not through a device), and viewing it as Telelocation on a client device. This can occur for a variety of reasons including, but not limited to: limited precision and/or inaccuracies in device sensors, mapping the real world onto a flat image for storage and then remapping it for a 360-180 view, and camera lens distortions.

The aspects of Example 600 can also be applied to another user who has received the Telelocation and is viewing it. In this case, the user 605 can be considered the user who has received the Telelocation data on their device 610 and is the "viewing user". In this case, the viewing user 605 is located at some place in the world, but sees the received Telelocation as if they were at the same location 645 of the authoring user. Additionally, the frame of reference (heading 630 and pitch 615) ensure that the Telelocation data received is displayed relative to the respective angles such that as the viewing user 605 pans their client device 610, they see the Telelocation just as the authoring user would, had the authoring user panned in the same manner. Likewise, if the digital media software allows the user to move around within the bounding volume, they would see the correct details at the correct orientation.

Should either the authoring user or viewing user add or update digital media data, the addition or update will appear in the same location on both devices in real time, and either user may be able to interact with it.

Figure 8:
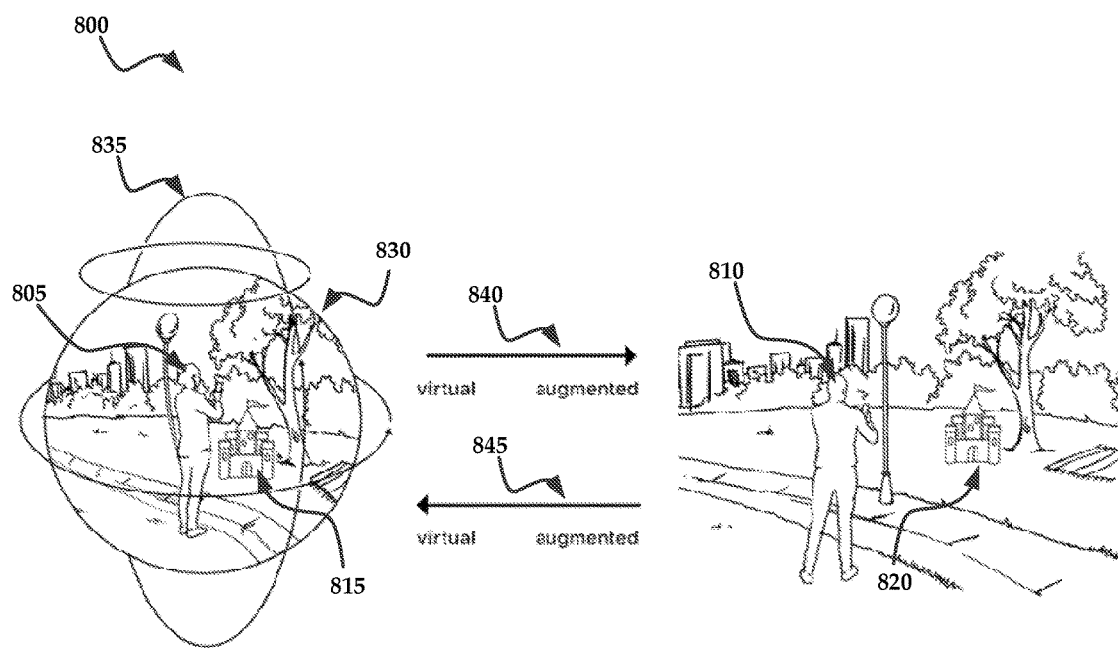
FIG. 8 is an illustration of an exemplary mixed-reality scenario, whereby digital media objects may be added or updated in one reality, and the changes are reflected in real time in the other reality.

FIG. 8 depicts an example of a mixed-reality scenario 800 whereby a digital media object 805 may be added or updated by a user in one reality, and the changes are reflected in real time so that they appear to a user who is in the other reality 820 or vice versa. This covers changes made in the virtual space (i.e. when viewing the Telelocation) which are then seen in real time an AR environment 840, and conversely when changes are made in an AR environment and seen in real time with the virtual space 845.

In example 800, a user 805 may be viewing a Telelocation as a virtual rendering on their device and may add or update a virtual digital object 815 (in this example, a virtual sandcastle object). The data for that virtual object is transmitted to another user 810 who is viewing the actual real world location corresponding to that Telelocation through a device with digital media software that can render AR. This is an example of case 840 where the data for the update is being transmitted from the user's device viewing the virtual world 805 to the user's device that is viewing the real world with AR 810. The user viewing the real world with AR 810 then sees the new or updated object 820 appear in real time through their AR device.

Conversely, user 810 who is viewing the real world through an AR device, can add or update a virtual digital object 820, and the data will be sent to the device of user 805 who is viewing the virtual Telelocation rendering of the real world location that user 810 is viewing. This is an example of case 845 where the data for the update is being transmitted from the user who is viewing the real world with AR 810 to the user who is viewing the virtual Telelocation rendering 805. If the digital object added or modified by user 810 exists within the bounding volume 830 of the Telelocation that user 805 is viewing, then that visual change will appear in real time on user 805's device.

In both cases 840 and 845, the established frame of reference, which is the position and orientation of the Telelocation 835, are used to ensure that the virtual digital media object(s) are correctly positioned and oriented when viewed in either reality.

The overall effect of the process illustrated in example 800, is that users in different realities can view the same virtual objects and any additions or updates to the those objects, in real time, regardless of which reality they are viewing.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description, for purposes of explanation and not limitation, specific details are set forth, such as particular embodiments, procedures, techniques, etc. in order to provide a thorough understanding of the various exemplary embodiments. However, it will be apparent to one skilled in the art that various exemplary embodiments may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for generating a telelocation, the method comprising:
    capturing visual content representing a real world location by a device associated with a user;
    automatically associating a geographic location with the captured visual content;
    automatically associating orientation data with the captured visual content;
    transmitting a data bundle comprising the captured visual content, the geographic location and the orientation data to a server;
    notifying a remote user about the data bundle on the server;
    in response to receiving an acceptance from the remote user, transmitting the data bundle from the server to a device associated with the remote user to create a virtual rendering of the real world location; further comprising the remote user placing augmented reality graphics content in the virtual rendering or in the real world location.

2. The method of claim 1, further comprising the visual content including any of a virtual reality 360-180 degree panorama or a virtual reality 360 degree movie.

3. The method of claim 1, further comprising the geographic location including a longitude, a latitude and an altitude.

4. The method of claim 1, further comprising the orientation data including a current azimuth angle relative to True North.

5. The method of claim 4, further comprising the remote user viewing the virtual rendering relative to an actual position of the visual content using the orientation data including the current angle relative to the True North.

6. The method of claim 1, further comprising the user updating in real time the virtual rendering of the real world location.

7. The method of claim 1, further comprising the user placing augmented reality graphics content in the virtual rendering.

8. The method of claim 7, further comprising the remote user viewing in real time the augmented reality graphics content in the virtual rendering.

9. The method of claim 1, further comprising the user viewing in real time the augmented reality graphics content from the virtual rendering or in the real world location.

10. The method of claim 1, further comprising capturing the geographic location with GPS hardware of the device.

11. The method of claim 1, further comprising capturing the orientation data using any of a sensor on the device, or EXIF information from the visual content.

12. The method of claim 1, the orientation data further comprising one or more parameters stored when the visual content is captured, the one or more parameters representing a reference for future virtual rendering of the real world location.

13. The method of claim 12, further comprising the device associated with the remote user displaying the virtual rendering of the real world location when the remote user device reads the reference.

14. The method of claim 1, further comprising the orientation data including a current elevation angle relative to a horizon.

15. A method for generating a telelocation, the method comprising:
    capturing visual content and related data representing a virtual reality location by a device associated with a user;
    automatically associating a location with the captured visual content;
    automatically associating orientation data with the captured visual content;
    transmitting a data bundle comprising the captured visual content, the location and the orientation data to a server;
    notifying a remote user about the data bundle on the server;
    in response to receiving an acceptance from the remote user, transmitting the data bundle from the server to a device associated with the remote user to create a rendering of the virtual reality location; and the orientation data further comprising one or more parameters stored when the visual content is captured, the one or more parameters representing a reference for future rendering of the virtual reality location.

16. The method of claim 15, further comprising the device associated with the remote user rendering of the virtual reality location when the remote user device reads the reference.

17. The method of claim 15, further comprising using the reference to position or orientation of the virtual reality location within a telelocation.

18. The method of claim 15, further comprising the user updating in real time the rendering of the virtual reality location.

19. The method of claim 15, further comprising the user placing augmented reality graphics content in the rendering of the virtual reality location.

20. The method of claim 19, further comprising the remote user viewing in real time the augmented reality graphics content in the rendering of the virtual reality location.

21. The method of claim 15, further comprising the remote user placing augmented reality graphics content in the rendering of the virtual reality location.

22. The method of claim 21, further comprising the user viewing in real time the augmented reality graphics content from the rendering of the virtual reality location.

23. A method for generating a telelocation, the method comprising:
    capturing visual content and related data representing a virtual reality location by a device associated with a user;
    automatically associating a location with the captured visual content;
    automatically associating orientation data with the captured visual content;

transmitting a data bundle comprising the captured visual content, the location and the orientation data to a server;
notifying a remote user about the data bundle on the server;
in response to receiving an acceptance from the remote user, transmitting the data bundle from the server to a device associated with the remote user to create a rendering of the virtual reality location in a real world location; and further comprising the user updating in real time the rendering of the virtual reality location in the real world location.

24. The method of claim 23, further comprising the user placing augmented reality graphics content in the rendering of the virtual reality location in the real world location.

25. The method of claim 24, further comprising the remote user viewing in real time the augmented reality graphics content in the rendering of the virtual reality location in the real world location.

26. The method of claim 23, further comprising the remote user placing augmented reality graphics content in the rendering of the virtual reality location in the real world location.

27. The method of claim 26, further comprising the user viewing in real time the augmented reality graphics content from the rendering of the virtual reality location in the real world location.

* * * * *